US006836402B1

(12) United States Patent
Huang

(10) Patent No.: US 6,836,402 B1

(45) Date of Patent: Dec. 28, 2004

(54) TRANSPARENT WINDOW STRUCTURE FOR MULTIPLE SOCKET

(76) Inventor: Pei-Chin Huang, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/610,537

(22) Filed: Jul. 2, 2003

(51) Int. Cl.[7] .................................................. H02B 1/00

(52) U.S. Cl. ....................... 361/601; 361/600; 361/679; 174/50; 174/53; 174/55; 439/488; 439/489; 439/490; 439/491

(58) Field of Search ................................ 361/600, 601, 361/627–628, 641, 643; 174/17 R, 50, 135; 439/910

(56) References Cited

U.S. PATENT DOCUMENTS

| | | | | | |
|---|---|---|---|---|---|
| 5,184,279 | A | * | 2/1993 | Horn | 361/641 |
| 5,249,097 | A | * | 9/1993 | Bassin | 361/600 |
| 5,277,620 | A | * | 1/1994 | Taylor | 439/490 |
| 5,331,502 | A | * | 7/1994 | Bakhoum | 361/212 |
| D362,433 | S | * | 9/1995 | Chen | D14/441 |
| 5,780,775 | A | * | 7/1998 | Yu | 174/135 |
| 6,121,889 | A | * | 9/2000 | Janda et al. | 340/815.47 |
| 6,273,578 | B1 | * | 8/2001 | Lai | 362/95 |

* cited by examiner

*Primary Examiner*—Boris Chervinsky

(74) *Attorney, Agent, or Firm*—Troxell Law Office PLLC

(57) ABSTRACT

A transparent window for a multiple socket includes a housing and a transparent plate. Wherein, the socket is provided with receptacles and an embedding region. The embedding region is for forming a transparent window by covering the transparent plate thereon, and the transparent plate is further formed with indicative or decorative texts and symbols, thereby indicating uses of individual receptacles of the multiple socket and decorating the multiple socket.

3 Claims, 7 Drawing Sheets

TRANSPARENT WINDOW STRUCTURE FOR MULTIPLE SOCKET

BACKGROUND OF THE INVENTION (a) Field of the Invention

The invention relates to a transparent window structure for a multiple socket, and more particularly, to a transparent window formed by a transparent plate covering a dented embedding region disposed on a multiple socket. The transparent plate is provided with indicative or decorative drawings, texts and symbols for indicating uses of receptacles of the multiple socket or for decorating the multiple socket.

(b) Description of the Prior Art

A multiple socket is formed by disposing a multiple sets of receptacles on a same housing, which then becomes a unit having multiple sets of receptacles. The unit is connected to a power supply via a relatively long power line in order to provide individual receptacles at the housing with power supply. An extension wire socket, for instance, is a type of multiple socket. In another type of multiple socket, a power pin is directly disposed at a housing thereof. Through the pin inserted in the power socket, each receptacle at the socket is provided with power supply. One example of this prior art is "Expandable Socket" disclosed by the Taiwan Patent Publication No. 380759.

Regardless of the type of multiple socket acquiring power supply using either a power line or an inserted pin, a main characteristic thereof is that multiple sets of receptacles are gathered at a same housing. FIGS. 8 and 9 of the U.S. Pat. No. 6,392,171 disclose another two different types of multi-sockets having the same characteristic. Since a multiple socket has multiple sets of receptacles and even multiple sets of switches, it is rather difficult to distinguish which plug belongs to which electric appliance when all the receptacles are inserted with plugs. Hence, pulling unintended plugs that further incurring accidental power cutoffs is considered as repeated occurrence. In the view of this issue, industrialists have proposed a design disclosed by the Taiwan Patent Publication No. 422423, wherein identification cards having distinct colors are provided at a fixed base and an upper cover thereof. The identification cards are disposed with insertion openings corresponding with the receptacles, and electric appliances connected are thus distinguished using the distinct colors. However, this structure still has drawbacks when put to use due to the following reasons:

1. This structure merely uses distinct colors as a measure for identification, but lacks a method for a user to remember electric appliances represented by individual colors. Especially in a long-term use, colors for corresponding electric appliances are likely forgotten. Therefore, the measure using colors is not at all practical.
2. According to this structure, identification is carried out through colors of the identification cards at the socket. However, when a plug of an adaptor having a larger volume is inserted into this structure, the identification cards are likely to be concealed by the adaptor plug. Consequently, a user cannot easily make appropriate identifications even in the presence of the identification cards having distinct colors.

Furthermore, when a multiple socket is being sold or given as a gift, a housing thereof is often attached with stickers containing texts indicating brand name, precautions for use, product features, name of the person giving the gift or events of remembrance. Nevertheless, these sticker labels are prone to cock up or peel off owing to temperature change or slackening of adhesive properties thereof, and thus again offering inadequate practicability.

SUMMARY OF THE INVENTION

The primary object of the invention is to provide a multiple socket having clear indicative functions, wherein each set of receptacles or switches is labeled for indicating corresponding electric appliances, thereby enabling a user to appropriately turn on and off power supplies of the electric appliances using the multiple socket.

The secondary object of the invention is to provide a multiple socket having special visual effects, wherein a three-dimensional interlining effect formed by a transparent plate thereof offers the multiple socket with an enhanced texture.

To accomplish the aforesaid objects, the invention provides a transparent window structure for a multiple socket having marking, decorative and indicative purposes. The invention comprises a housing and a transparent plate. Wherein, apart from receptacles, the housing is also disposed with a dented embedding region for forming a transparent window by covering the transparent plate thereon. The transparent plate is further provided with indicative or decorative texts and symbols, thereby indicating uses of individual receptacles of the multiple socket or decorating the multiple socket.

DETAILED DESCRIPTION OF THE PREFERRED EMBODIMENTS

Various embodiments according to the invention are capable of accomplishing indicative and decorative purposes, and detailed descriptions shall be given with the accompanying drawings hereunder.

Figure 1:
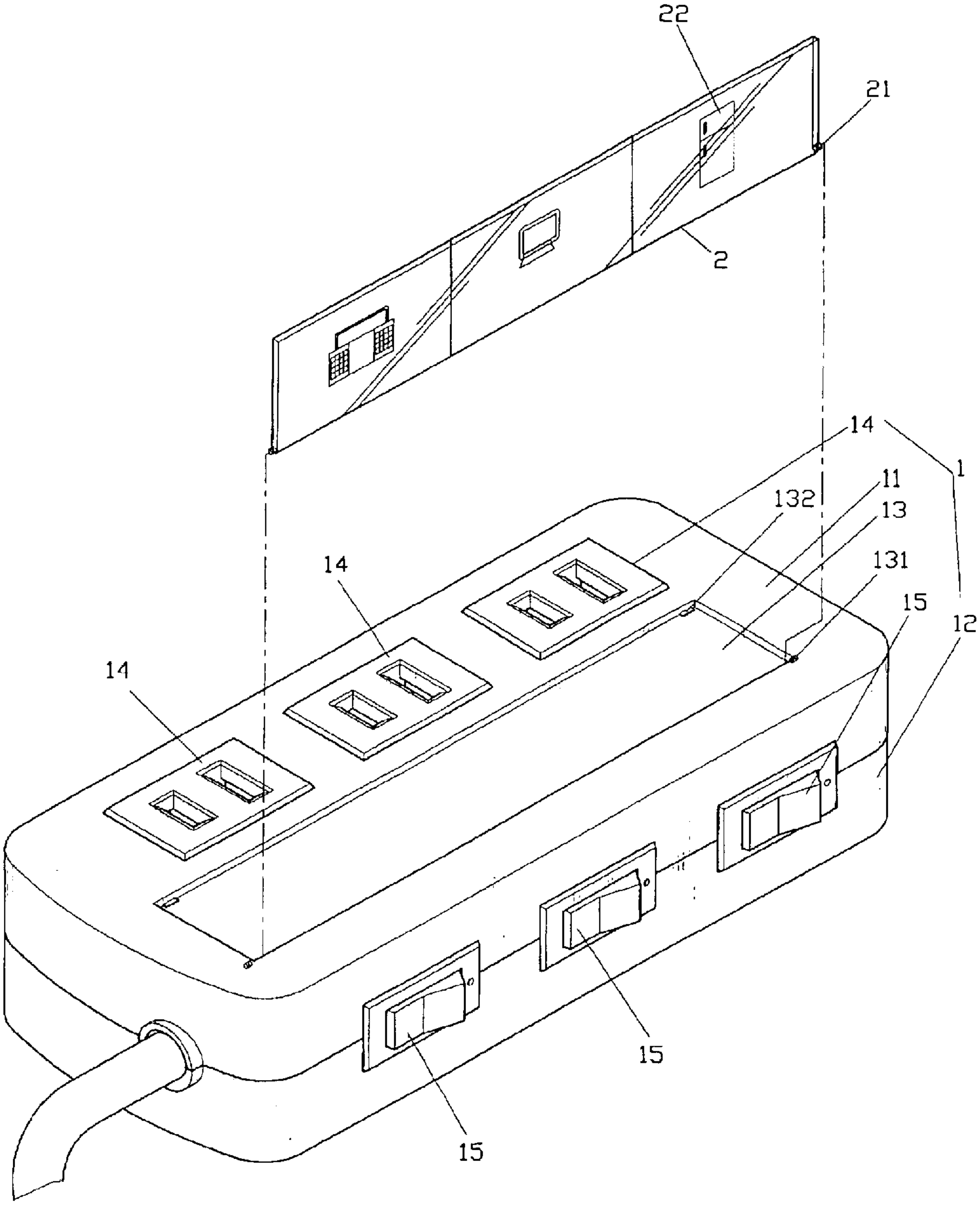
FIG. 1 shows a structural schematic view of a first embodiment according to the invention.

Referring to FIG. 1 showing a structure of a first embodiment, the invention comprises a housing 1 and a transparent plate 2.

The housing 1 is consisted of a cover 11 and a base 12. The cover 11 is provided with a dented embedding region 13. The embedding region 13 is disposed with a pivotal opening 131 at two corners at one side thereof, respectively, and is formed with a projecting butting piece 132 at inner edges of the other side thereof, respectively. The housing 1 is further provided with a plurality of sets of receptacles 14 and switches 15.

The transparent cover 2 is provided with a protruding flange 21 at two sides thereof in order to correspond with the pivotal openings 131 at the embedding region 13 of the housing 1. A lower side of the transparent cover 2 is further formed texts and symbols 22, which are for serving indicative purposes and are disposed for corresponding with positions of the receptacles 14 or switches 15. The texts and symbols 22 may also serve for decorative purposes, and are common texts, drawings, signs or symbols. In this embodiment, the texts and symbols 22 are provided for corresponding with the receptacles 14 at the housing 1, and are indicative drawings representing types of electric appliances and are directly printed at the lower side of the transparent cover 2.

Figure 2:
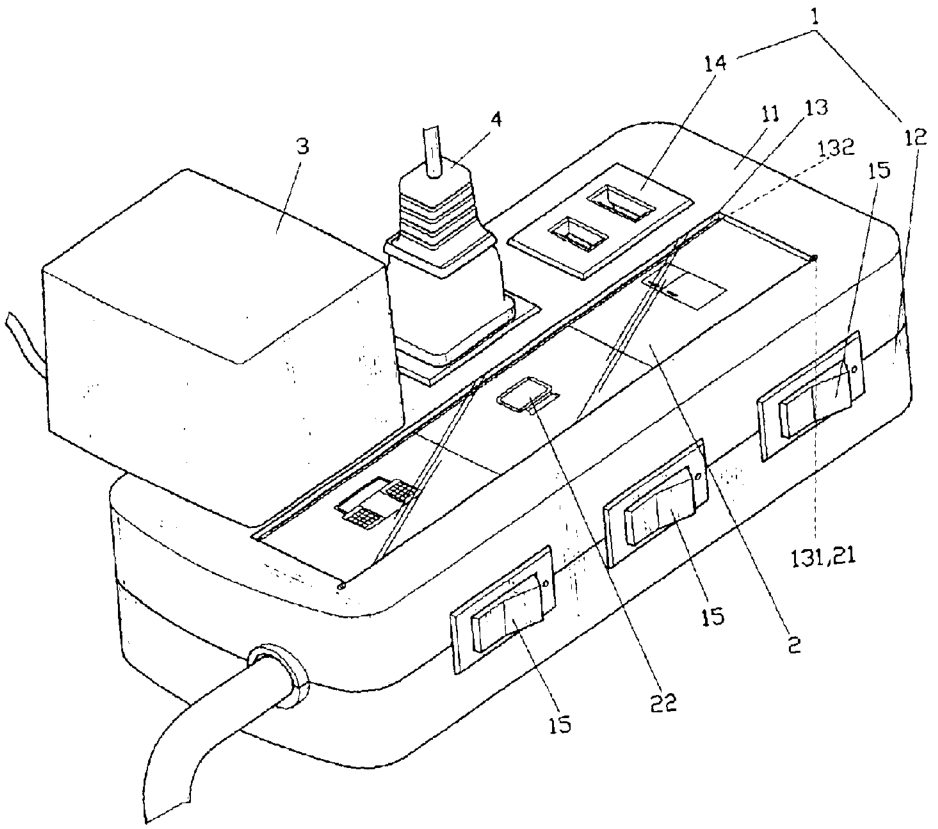
FIG. 2 shows an elevational schematic view of the first embodiment according to the invention.

For assembly, referring to FIG. 2, the flanges 21 of the transparent cover 2 are placed into the pivotal openings 131 of the housing 1, so as to correspondingly cover and butt the transparent cover 2 onto the embedding region 13 by butting against the butting pieces 132. Because the texts and symbols 22 at the lower side of the transparent plate 2 are provided for corresponding with the receptacles 14 of the housing 1, the texts and symbols 22 are suitable for indicating purposes of individual receptacles 14. In addition, for that the transparent plate 2 is disposed at a side of the receptacles 14, the texts and symbols 22 at the transparent plate 2 remain apparent even if an adaptor plug 3 having a larger volume or a large plug 4 is inserted into the receptacles 14.

Figure 3:
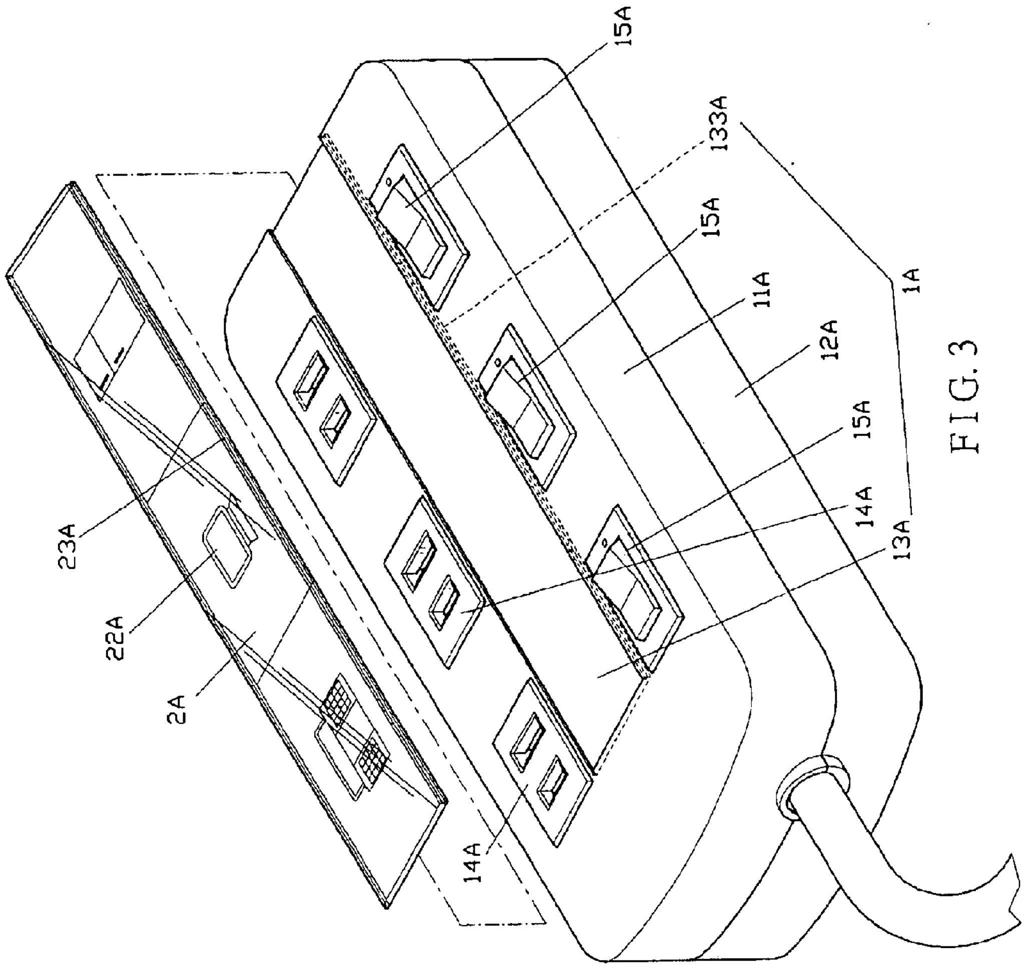
FIG. 3 shows a structural schematic view of a second embodiment according to the invention.

Referring to FIG. 3 showing a second embodiment according to the invention, a housing 1A is provided with an embedding region 11A at a cover 11A and between receptacles 14A and switches 15A. The embedding region 13A is disposed with a wedge groove 133A at two corresponding inner edges thereof, respectively. Two sides of a transparent plate 2A are similarly formed with a wedge portion 23A for corresponding with the wedge grooves 133A, respectively. The wedge portions 23A of the transparent plate 2A are slid and wedged at the corresponding wedge grooves 133A, so as to correspond individual texts and symbols 22A with individual receptacles 14A and switches 15A for offering same indicative purposes.

Figure 4:
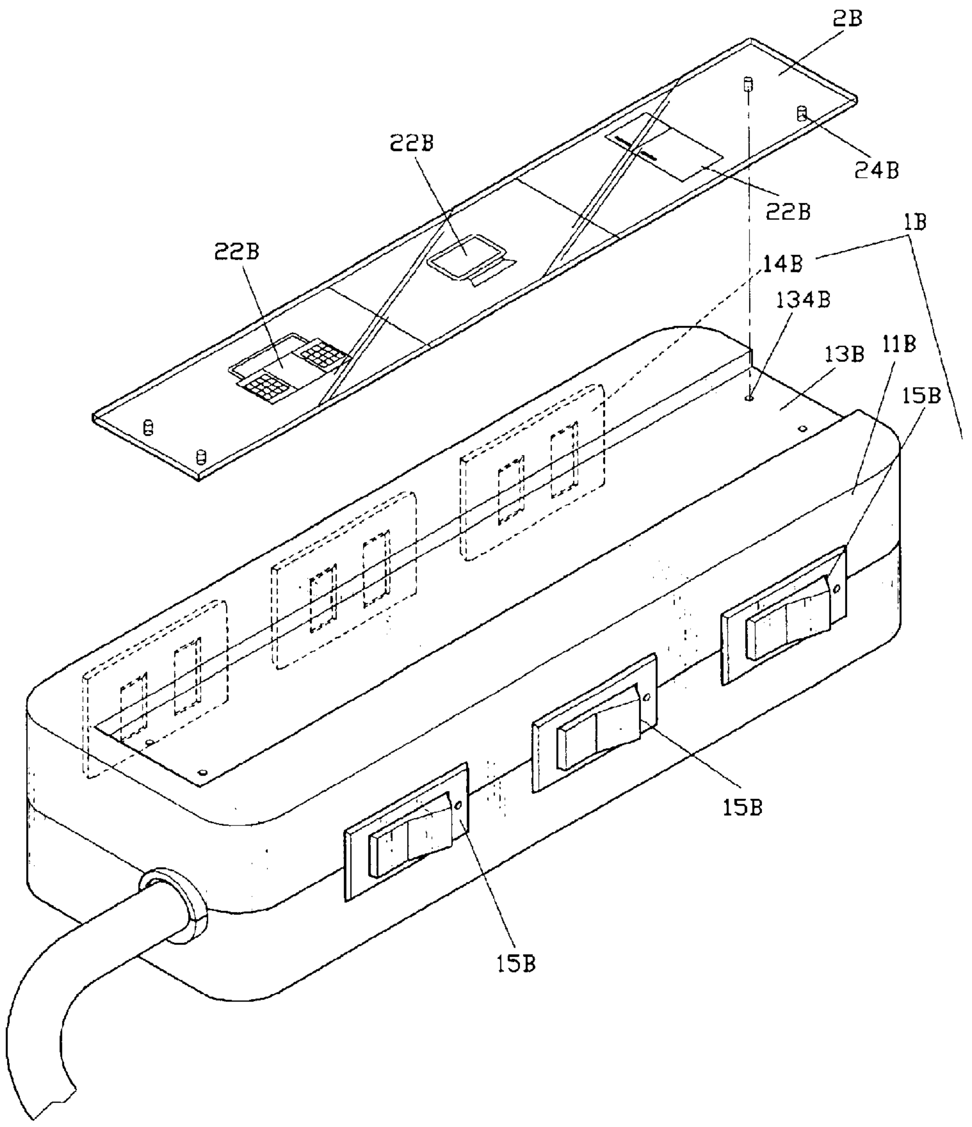
FIG. 4 shows a structural schematic view of a third embodiment according to the invention.

Referring to FIG. 4 showing a third embodiment according to the invention, a cover 11B of a housing 1B is provided with an embedding region 13B having a plurality of positioning holes 134B. A transparent plate 2B is a board formed according to a size of the corresponding embedding region 13B. A bottom portion of the transparent plate 2B is disposed with a plurality of positioning pillars 24B for corresponding with the plurality of positioning holes 134B, and a lower side of the transparent plate 2B is printed with texts and symbols 22B. When the positioning pillars 24B at the transparent plate 2B are placed into the corresponding positioning holes 134B at the embedding region 13B, the texts and symbols 22B at the transparent plate 2B are corresponded with individual receptacles 14B and switches 15B, so as to indicate uses of the receptacles 14B and the switches 15B.

Figure 5:
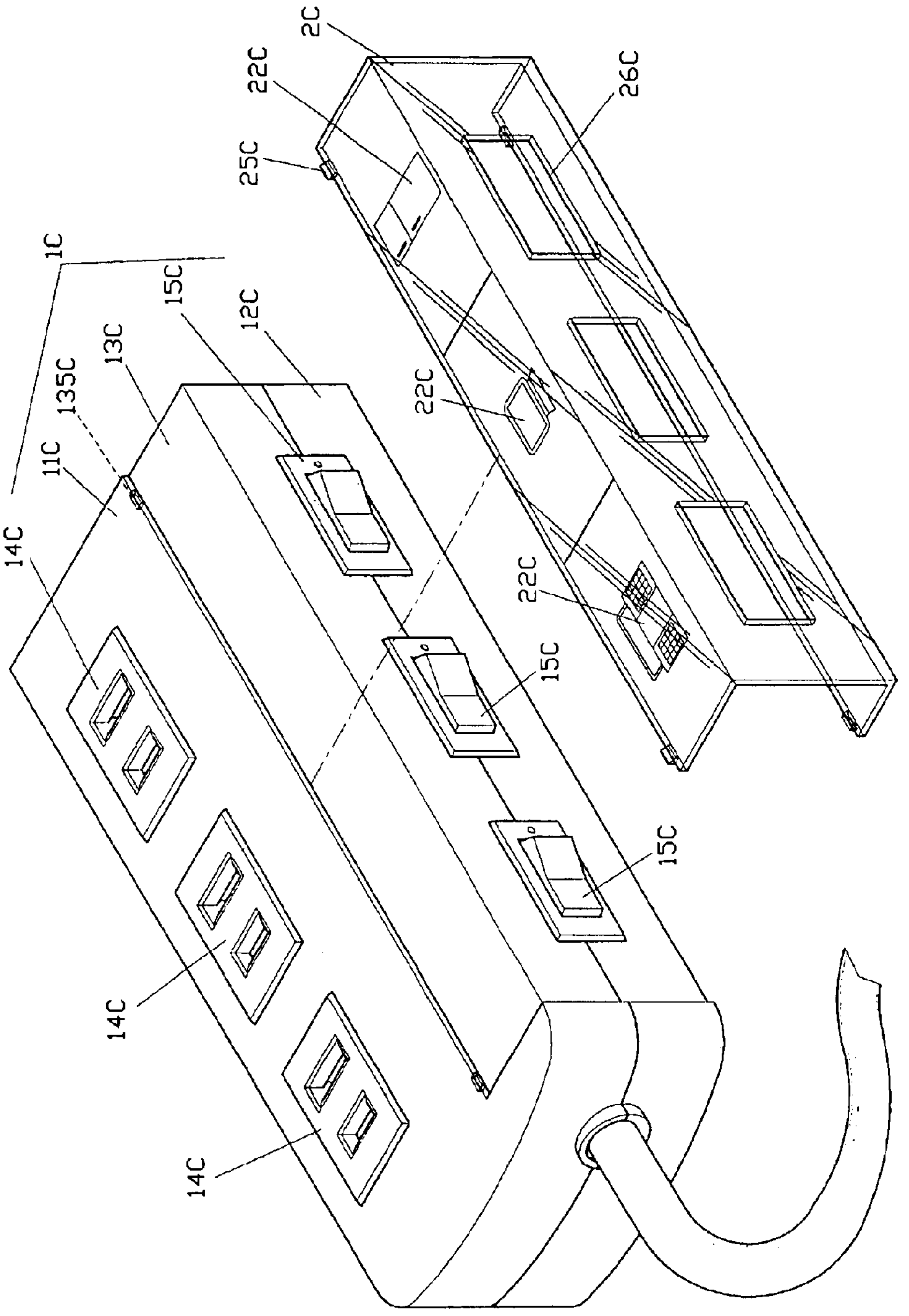
FIG. 5 shows a structural schematic view of a fourth embodiment according to the invention.

Referring to FIG. 5 showing a fourth embodiment according to the invention, an embedding region 13C of a housing 1C is extended from a top horizontal side plane of a cover 11C, across a vertical side plane of the cover 11C and a base 12C, and to a bottom horizontal side plane of the base 12C. Edges of the top and bottom horizontal planes of the embedding region 13C are disposed with fastening openings 135C. A transparent plate 2C is formed as a U-shaped board for placing into the corresponding embedding region 13C. Horizontal edges of the transparent plate 2C are disposed with tenons 25C for corresponding with the fastening openings 135C, and a vertical plane of the transparent plate 2C is disposed with accommodating apertures 26C according to positions, sizes and number of switches 15C. The transparent plate 2C is then embedded into the embedding region 13C by placing the tenons 25C into the fastening openings 135C, so as to contain the switches 15C in the accommodating apertures 26C.

Figure 6:
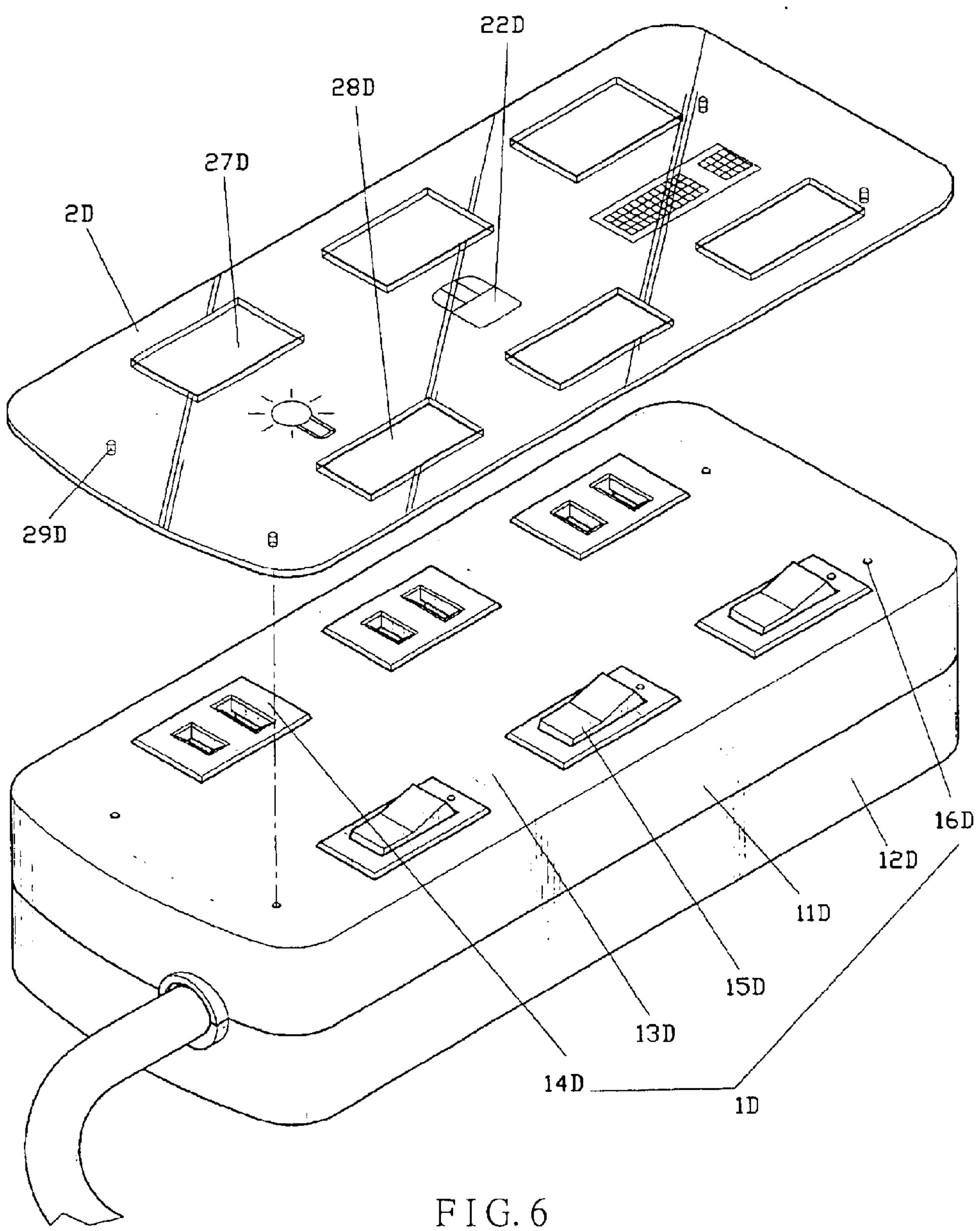
FIG. 6 shows a structural schematic view of a fifth embodiment according to the invention.

Referring to FIG. 6 showing a fifth embodiment according to the invention, a full-breadth embedding region 13D is formed across a surface of a cover 11D of a housing 1D. The embedding region 13D is disposed with a plurality of positioning holes 16D. A transparent plate 2D is provided with accommodating apertures 27D and 28D for corresponding with sizes and number of receptacles 14D and switches 15D, and a lower side of the transparent plate 2D is disposed with protruding positioning pillars 29D for corresponding with the positioning holes 16D at the cover 11D of the housing 1D. The positioning pillars 29D at the transparent plate 2D are placed into the corresponding positioning holes 16D at the housing 1D, and the transparent plate 2D is levelly located onto the embedding region 13D at the surface of the cover 11D. The receptacles 14D and the switches 15D are contained within the accommodating apertures 27D and 28D, and uses of individual receptacles 14D and the switches 15D are indicated by texts and symbols 22D at the transparent plate 2D.

Figure 7:
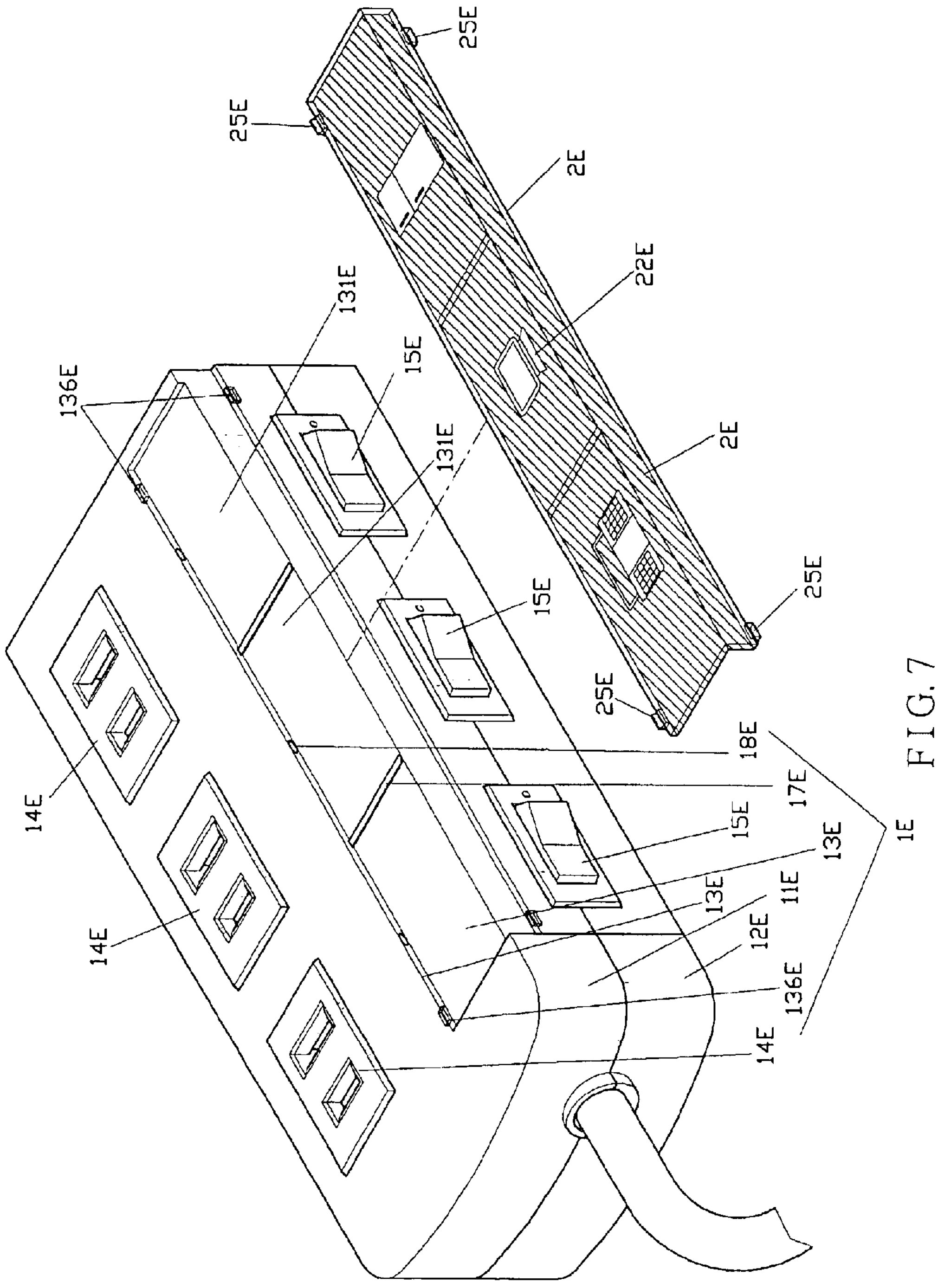
FIG. 7 shows a structural schematic view of a sixth embodiment according to the invention.

Referring to FIG. 7 showing a sixth embodiment according to the invention, an embedding region 13E is disposed at a side of a cover 11E of a housing 1E. The embedding region 13E is divided into a plurality of partitions 131E corresponding to positions of receptacles 14E using baffle strips 17E. Each partition 131E is placed with a lamp 18E connected with internal circuits, and fastening openings 136E are disposed at embedding region edges where the embedding region 13E comes into contact with edges of a transparent plate 2E. The edges of the transparent plate 2E are disposed with tenons 25E for corresponding with the fastening openings 136E at the embedding region 13E. During assembly, the tenons 25E at the transparent plate 2E are placed into the corresponding fastening openings 136E at the embedding region 13E, so as to cover individual texts and symbols 22E at a lower side of the transparent plate 2E to corresponding individual partitions 131E. Using light sources provided by the lamps 18E in the partitions 131E at the embedding region 13E, especially in dark surroundings, the texts and symbols 22E at the transparent plate 2E are illuminated into a bright state for facilitating quick identification.

In the embodiment disclosed in FIG. 7, the lamps 18E are provided at the embedding region 13E for assisting illumination of the texts and symbols 22E at the transparent plate 2E. This illumination method may also be adopted in other aforesaid embodiments. Apart from illumination purposes, the lamps 18E may also project light beams onto the transparent plate 2E from different directions for providing decorative effects.

In the above embodiments, the texts and symbols may be indicative symbols or texts, and may be decorative drawings, patterns or other illustrative texts and labels. The texts and symbols may be formed at the transparent plate by means of printing, adhering, combining, etching, formed integral, laser processing or other known processing methods.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A transparent window for a multiple socket comprising:

a) a housing having:
  i) a housing cover;
  ii) a housing base;
  iii) an embedded region; and
  iv) a plurality of receptacles; and b) a transparent cover located in the embedded region and having text and symbols located thereon, wherein the transparent cover has text and symbols corresponding to each of the plurality of receptacles.

2. The transparent window according to claim 1, wherein the text and symbols are located on a lower side of the transparent cover.

3. The transparent window according to claim 1, further comprising lamps located in the embedded region.

* * * * *